(12) United States Patent
Goessel et al.

(10) Patent No.: US 7,979,783 B2
(45) Date of Patent: Jul. 12, 2011

(54) ERROR DETECTION DEVICE AND METHOD FOR ERROR DETECTION FOR A COMMAND DECODER

(75) Inventors: Michael Goessel, Mahlow (DE); Franz Klug, Munich (DE); Steffen Marc Sonnekalb, Taufkirchen (DE)

(73) Assignee: Infineon Technologies AG (DE)

( * ) Notice: Subject to any disclaimer, the term of this patent is extended or adjusted under 35 U.S.C. 154(b) by 1025 days.

(21) Appl. No.: 11/672,652

(22) Filed: Feb. 8, 2007

(65) Prior Publication Data

US 2007/0192656 A1 Aug. 16, 2007

(30) Foreign Application Priority Data

Feb. 8, 2006 (DE) .......................... 10 2006 005 818

(51) Int. Cl.
*G06F 11/00* (2006.01)
*G08C 25/00* (2006.01)
*H03M 13/00* (2006.01)
*H04L 1/00* (2006.01)

(52) U.S. Cl. ......................... 714/799; 712/215; 712/228

(58) Field of Classification Search .................... 714/17, 714/799, 800; 712/215, 228
See application file for complete search history.

(56) References Cited

U.S. PATENT DOCUMENTS

| | | | |
|---|---|---|---|
| 4,920,538 A | 4/1990 | Chan et al. | |
| 5,278,848 A | 1/1994 | Yamaguchi | |
| 5,784,393 A | 7/1998 | Byers et al. | |
| 5,838,896 A * | 11/1998 | Han | ................................. 714/23 |
| 6,128,755 A | 10/2000 | Bello et al. | |
| 6,247,118 B1 * | 6/2001 | Zumkehr et al. | ................ 712/228 |
| 6,543,028 B1 * | 4/2003 | Jamil et al. | ..................... 714/800 |
| 6,785,842 B2 * | 8/2004 | Zumkehr et al. | ................. 714/17 |
| 7,543,221 B2 * | 6/2009 | Mukherjee et al. | ............ 714/800 |
| 2005/0108509 A1 * | 5/2005 | Safford et al. | ................. 712/215 |

FOREIGN PATENT DOCUMENTS

DE 103 60 196 A1 7/2005

OTHER PUBLICATIONS

Ray, J et al.; "Dual Use of Superscalar Datapath for Transient-Fault Detection and Recovery"; Proceedings of the 34th annual ACM/IEEE International Symposium on Microarchitecture, Austin, Texas, 2001, pp. 214-224.

* cited by examiner

*Primary Examiner* — Sam Rizk
(74) *Attorney, Agent, or Firm* — Dickstein Shapiro LLP

(57) ABSTRACT

An error detection device for a command decoder is described, the command decoder reading out an associated sequence of control signal words from a command memory based on an input word, wherein the sequence of control signal words has at least one control signal word, having: a controller designed to provide the input word at a first time and the input word at a second time for reading out the command memory, wherein the second time is delayed with respect to the first time, to effect a readout of the sequence of control signal words at a first time and a readout of the sequence of control signal words at a second time; and a comparator designed to receive and compare the associated sequences of control signal words read out at the first and second times, and to output a signal indicating an error if the associated sequences of control signal words read out at the first and second times are different.

13 Claims, 1 Drawing Sheet

ND METHOD
ERROR DETECTION DEVICE AND METHOD FOR ERROR DETECTION FOR A COMMAND DECODER

CROSS-REFERENCE TO RELATED APPLICATION

This application claims priority from German Patent Application No. 10 2006 005 818.6, which was filed on Feb. 8, 2006, and is incorporated herein by reference in its entirety.

BACKGROUND

An instruction decoder encodes instructions into control signals and parameters for a data path. The coding depends on the status signals. The status signals depend on the state of the computer, particularly on register contents, on memory contents and on the respectively executed instruction.

In general, an instruction has the form "op, [address 1], ..., [address k], [parameter]". The expressions between square brackets [ ] may or may not occur, i.e. they are optional. In the following example, k=2. "op" refers to the operation to be carried out. Examples are "add", "XOR", "jump". The addresses [address 1], ..., [address 1] are register addresses of the register file also referred to as register field.

In the instruction "add, address 1, address 2, address 3", the data stored in the registers at the addresses "address 1" and "address 2" are added and written into the register with the address "address 3". There is no parameter in this instruction.

The instruction decoder is responsible for transforming the instruction to a sequence of control words. In a sequence of control words associated with an instruction by the decoder, a sequence of control signals for the data path and corresponding parameters are determined so that the instruction present at the instruction decoder is executed in the computer.

In general, the sequence of control words associated with an instruction does not only depend on the instruction, but, as mentioned, also on the state of the computer and, in certain rare cases, also on the parameters of the instruction. The state of the computer affects the sequence of control signals by the status signals of the computer.

More specifically, various sequences of control signals are associated with an instruction, wherein the sequence of control signals that is actually to be used is selected by the status signals and also by the values of the parameters. If, for example, the parameters are an address in the external memory, the value of a particular bit of this address may decide, for example, which external memory is accessed. For an instruction, the number of control words in the various sequences of control words is generally different.

To explain this in more detail, it will be assumed in the following that, in the considered processor, one sequence of control words, two different sequences of control words or three different sequences of control words are associated with an instruction.

A generalization to more than three different sequences of control words is possible.

If two different sequences of control words are associated with an instruction, they start with some common control signal words and branch depending on the values of certain status symbols or certain parameter values.

As an example, consider the instruction "if Reg(address 1)≦i goto address 2" (corresponding to a JLE address 1, i, address 2). The instruction contains the address "address 1" and the parameter "i, address 2", which is given here by an integer value i and an address "address 2". The operation code, which is also abbreviated as opcode, is "if Reg( )≦( ) goto( )".

First, the contents of the register with the address "address 1" are compared to the value i. For this purpose, the contents of the register with the address "address 1" in the register field are read, the read value is subtracted from the, for example, sign-extended parameter i in the arithmetic logic unit, abbreviated ALU. After the subtraction, the instruction branches. Depending on the value, 0 or 1, of the sign bit of the ALU, the process proceeds with the next instruction or the instruction with the relative address "address 2".

The considered instruction is thus associated with two different control sequences which branch after a common initial sequence. The status signal selecting and/or determining a control sequence from the two possible control sequences at the branch point is here the sign bit of the ALU.

In the command "addi Reg(address 1), Reg(address 2), K", "address 1" and "address 2" are addresses of registers of the register field, and the parameter "K" is an integer number and/or an integer natural number which is added to the value stored in register 1. The sum is stored in the register of the register field with the address "address 2". Only one control sequence is associated with this command.

If three different sequences of control words are associated with an instruction, these three sequences start with some common control words, they branch into two branches depending on the values of certain status symbols and/or status signals or certain parameter words, and one of the two branches then branches a second time depending on further status signals or parameter values.

The structure of the instruction decoder may be described as follows and/or the following three tasks may be associated with the instruction decoder: 1. determining sequences of control signal words for the data path; 2. determining sequences of control signal words for a control logic for applying the parameters of the instructions for modification to the ALU or a special sign extension unit. Such operations are, for example, sign extensions, inversion of all bits, inversion of selected bits of the parameters of the instructions. These operations may be performed in the ALU in most cases and, if any, partially in a special sign extension unit; 3. determining 1-out-of-n control signals for the register field from the binary addresses for the corresponding registers.

The first two tasks are combined in the following to form one task "determining sequences of control signals for data path and control logic". Correspondingly, the instruction decoder may be structurally made of the two following units: 1. module for determining control signal sequences for the data path and for the control logic; 2. address decoder for the register field.

In the following, the module for determining the sequences of control signals is described in more detail. For this purpose, first consider the case that two sequences of control words are associated with an instruction, wherein the current sequence of control words is selected by a function of the status signals or parameters. A control word $W^i$ consists of a control signal word $S^i = s_1^i, \ldots, s_{ni}^i$ and a parameter word $p^i = p_1^i, \ldots, p_{mi}^i$.

The components $s_1^i, \ldots, s_{ni}^i$ of the control signal word $S^i$ do not depend on the parameters of the instruction, but only on the operation code (opcode) and on the status signals or the parameter values of the instruction via the selection of the sequence of control signal words. The components $p_1^i, \ldots, p_{mi}^i$ of the parameter word $p^i$ are determined by the parameters of the instruction. They also depend on the status signals.

The module for determining the control sequences determines the associated sequence of control signal words for a considered instruction depending on the status signals or the parameter values.

In the following, now consider, by way of example, an instruction "instruction" with which the following two sequences of control signal words are associated:

1. $S^1, S^2, \ldots, S^i; S^{i+1}, \ldots, S^n$
2. $S^1, S^2, \ldots, S^i; S^{i+1\prime}, \ldots, S^{n\prime}$ As a specific example, consider the two sequences 1. $S^1, S^2; S^3, S^4$
2. $S^1, S^2; S^{3\prime}, S^{4\prime}, S^{5\prime}$ in the following, which are associated with the instruction "instruction".

The first i, in the example i=2, control signal words $S^1, S^2$ are equal in both sequences. The first or the second sequence is selected depending on the values of certain status signals. Such an association may be realized with a read-only memory, abbreviated ROM, and a counter.

The control signal words $S^1, S^2, \ldots, S^i$ are deposited at the consecutive addresses A+1, A+2, ..., A+i and/or $A_1, A_2, \ldots, A_i$, a mask of the status signals to be evaluated is deposited, for example, at the address A+i+1 and/or $A_{i+1}$, a vector of status signals $\sigma_1, \ldots, \sigma_k$ is deposited at the address A+i+2 and/or $A_{i+2}$, so that the status signals causing the branching assume the value required for the branching. The control signal word $S^{i+1}, S^3$ in the example, is deposited at the address A+i+4 and/or $A_{i+4}$. The jump address and/or address $A(S^{i+1\prime})$ for the control signal word $S^{i+1\prime}, S^{3\prime}$ in the example, is deposited at the address A+i+3 and/or $A_{i+3}$, and the control signal words $S^{i+1\prime}, \ldots, S^{n\prime}$ are deposited at the following addresses.

The control signal words $S^{i+1}, S^{i+2}, \ldots, S^n$ are stored at the addresses $A(S^{i+1}), A(S^{i+1})+1 \ldots, A(S^{i+1})+n-1$. If the comparison of the actually present status symbols with the stored status symbols shows a match, the counter is correspondingly incremented to the value A+i+4 and/or $A_{i+4}$.

If the comparison of the actually present status symbols with the stored status symbols does not show a match, the address $A(S^{i+1})$ stored at the address A+i+3 and/or $A_{i+3}$ is loaded into the counter, which now successively outputs the sequence of control signal words $S^i, S^{i+1}, \ldots, S^n$. The described implementation serves only as an example, other possibilities for implementation are also possible.

For the considered example with i=2, n=4 and n'=5, the result in the ROM is

| | |
|---|---|
| $A_1$ | $S^1$ |
| $A_2$ | $S^2$ |
| $A_3$ | mask status symbols = 1, 0, 1, 1, 0 |
| $A_4$ | values status symbols = 1, —, 0, 1, — |
| $A_5$ | jump address $A_8$ |
| $A_6$ | $S^3$ |
| $A_7$ | $S^4$ |
| $A_8$ | $S^{3\prime}$ |
| $A_9$ | $S^{4\prime}$ |
| $A_{10}$ | $S^{5\prime}$ |

The control signal words $S^1$ and $S^2$ are stored at the addresses $A_1, A_2$. They are common to both sequences. The mask of the status symbols relevant for the decision is given at the address $A_3$. The mask is arbitrarily assumed to be 1, 0, 1, 1, 0 in this example. Based on this mask, there is then made a decision based on the first, third and fourth status symbols which one of the two control signal sequences is to be generated. The mask at the first, third and fourth positions therefore has the value 1. The positions with the mask value 0, here the position 2 and 5, are not taken into account in the selection.

The actual values of the status symbols are given at the following address $A_4$, whose matching with the current status symbols decides about the continuation of the instructions.

For the considered example, 1, 0 and 1 have again been entered arbitrarily at the first, third and fourth positions.

The following is to apply to the current status symbols of the ALU in this example: If the first status symbol assumes the value 1, the third one assumes the value 0 and the fourth status symbol assumes the value 1, the address $A_4$ is incremented by two to $A_6$, and the control signal sequence is continued with $S^3, S^4$, which are deposited at the addresses $A_6, A_7$.

If it is not the case that the first status symbol is 1 and the third status symbol is 0 and the fourth status symbol is 1, the address $A_4$ is incremented by 1 to $A_5$. The jump address $A(S^{3\prime})=A_8$ is at this address.

The control signal sequences $S^{3\prime}, S^{4\prime}$ and $S^{5\prime}$ are stored at the addresses $A_8, A_9, A_{10}$, and the control signal sequence is continued with $S^{3\prime}, S^{4\prime}, S^{5\prime}$.

If a further division of a control signal sequence depending on status symbols is required, there may analogously be provided three further addresses with a mask of the relevant status symbols, with the actual values of the relevant status symbols and a jump address in the ROM.

If the continuation of a control signal sequence depends on parameter values, a mask for the parameter values may be used instead of the mask for status symbols, and the values of the parameters may be used instead of the values of the status symbols.

A bit in the mask may decide which type of mask, i.e. mask for status symbols or mask for parameters, it is.

By using the described masks and comparison bits, the status variables and the parameters may be avoided as input variables of the ROM, and the ROM with a small address width remains relatively small.

The time for processing an instruction, however, increases with each branch by an average of two and a half cycles.

The following will briefly discuss the task of the address decoder for the register field. If addresses for registers of the register field appear in a control word, they are to be coded into a 1-out-of-n bit code word by an address decoder. The associated hardware is a normal 1-out-of-n coder.

The parameters of an instruction are often used unmodified, sign-extended, negated or negated in special bits in a control word. These modifications are done depending on the respective instruction, on the specific parameter of the instruction and on status signals. Most of these operations may be performed in the ALU, for which the instruction decoder provides the control signals. The operations "sign extension" and "padding with zeros" are performed depending on the specific processor in the ALU or in a special combinatorial circuit, for example in a sign extension unit. When modifying the parameters, the task of the instruction decoder is to apply the parameters of the instructions to the ALU or to the sign extension unit at the right time, to provide the control signals and, if necessary, masks for the ALU or the sign extension unit and to provide the control signals and addresses for storing the result in the register field.

When decoding the commands and/or when determining control signal sequences for the data path and for the control logic, there is the danger that wrong control signal words or sequences of control signal words are read out or performed due to volatile bit errors. These bit errors may, for example, occur when reading out the individual control signal words from the ROM, during operations such as sign extension, inversion of all bits, inversion of selected bits of the parameters of the instructions, or when reading out or storing status bits.

BRIEF DESCRIPTION OF THE DRAWINGS

Preferred embodiments of the present invention are explained in more detail below with reference to the accompanying drawings, in which.

DESCRIPTION OF THE INVENTION

Figure 1A:
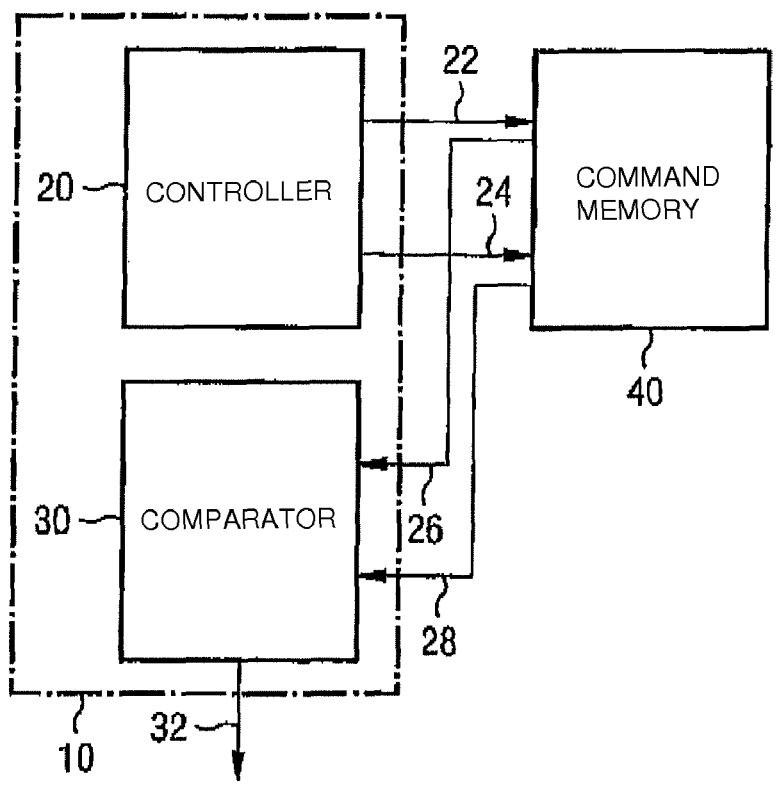
FIG. 1A shows an embodiment of an error detection device for a command decoder, wherein the sequences of control signal words read out at a first and at a second time are compared.

The present invention provides a device and a method for an improvement of the reliability of command decoders.

Furthermore, the present invention provides a computer program operating in accordance with the present methods.

In general, there are three different possibilities for error detection of errors in the instruction decoder: 1. protection of the individual modules: a) for the module for determination of the control signal sequences by two-port ROM or also by signature, and b) for the module address decoder for the register field by 1-out-of-n code check and regeneration of the input address and/or inputs, 2. protection of the whole instruction decoder by signature formation, and 3. protection of the whole instruction decoder essentially only by light-sensitive elements and simple codes.

The present invention relates to possibility 1. a) and possibility 2. The possibility 1. b) is described in the parallel application "Fehlererkennungsvorrichtung und Verfahren zur Fehlererkennung für einen Adressdecoder", filed together with the present application.

The invention provides an error detection device for a command decoder which, based on an input word, reads out an associated sequence of control signal words from a command memory, wherein the sequence of control signal words comprises at least one control signal word, comprising: control device designed to provide the input word at a first time and the input word at a second time for reading out the command memory, wherein the second time is delayed with respect to the first time, to effect a readout of the associated sequence of control signal words at a first time and a readout of the associated sequence of control signal words at a second time; and comparing device designed to receive and compare the associated sequences of control signal words read out at a first time and a second time, and to output a signal indicating an error if the associated sequences of control signal words read out at the first time and the second time are different.

Furthermore, the invention provides an error detection device for a command decoder reading out an associated sequence of control signal words from a command memory based on an input word, wherein the sequence of control signal words comprises at least one control signal word, and wherein a predetermined signature is associated with the sequence of control signal words, comprising: a control device designed to provide the input word for reading out the command memory and to effect a readout of the associated sequence of control signal words; an accumulation device designed to generate a signature based on the read out sequence of control signal words; a signature memory designed to store the predetermined signature; and comparing device designed to compare the signature of the read out sequence of control signal words and the predetermined signature and to output a signal indicating an error if the signature of the read out sequence of control signal words and the predetermined signature are different.

The invention provides a method for error detection for a command decoder which, based on an input word, reads out an associated sequence of control signal words from a command memory, wherein the sequence of control signal words comprises at least one control signal word, comprising: providing the input word at a first time and providing the input word at a second time for reading out the command memory, wherein the second time is delayed with respect to the first time, to effect a readout of the associated sequence of control signal words at a first and a second time; and receiving and comparing the associated sequences of control signal words read out at a first and a second time to output a signal indicating an error if the sequences of control signal words read out at the first and the second time are different.

Furthermore, the invention provides a method for error detection for a command decoder, which, based on an input word, reads out an associated sequence of control signal words from a command memory, wherein the sequence of control signal words comprises at least one control signal word, comprising: providing the input word for reading out the command memory; reading out the associated sequence of control signal words from the command memory; generating a signature based on the read out sequence of control signal words; storing a signature of the associated sequence of control signal words; and receiving and comparing the signature of the read out sequence of control signal words and the signature of the associated sequence of control signal words to output a signal indicating an error if the signature of the read out sequence of control signal words and the signature of the associated sequence of control signal words are different.

The significant advantage of the invention is that errors in a sequence of control signal words may be detected, so that then, for example by a repetition of the instructions or part of an instruction, the correct execution of the instruction may be guaranteed.

Embodiments of the invention may be implemented such that they do not only allow error detection in parameter-independent or status signal-independent control signal word sequences, but also error detection in parameter-dependent or status signal-dependent control signal word sequences.

If an error is detected, the instruction decoded as faulty may, for example, be repeated.

According to a preferred embodiment, a signal processing unit, for example the arithmetic logic unit (ALU), is doubled. If an ALU is used, a comparison of the ALU results may replace the comparison of the two control signal sequences with a time offset. The advantage of this procedure is that potential errors that may occur when reading out the data required for the operation may be detected by means of in that case different ALU results. Although a comparison of the control signal sequences indicates whether the command decoder provides the correct control words for an operation, errors during the readout of the data required for the operations remain undetected. If, however, the ALU results are compared, even such transient errors in the computing path are detected and an extended protection also covering the calculating unit is implemented.

According to a particularly preferred embodiment, the sign-extension unit is also doubled in addition to the ALU.

Figure 1B:
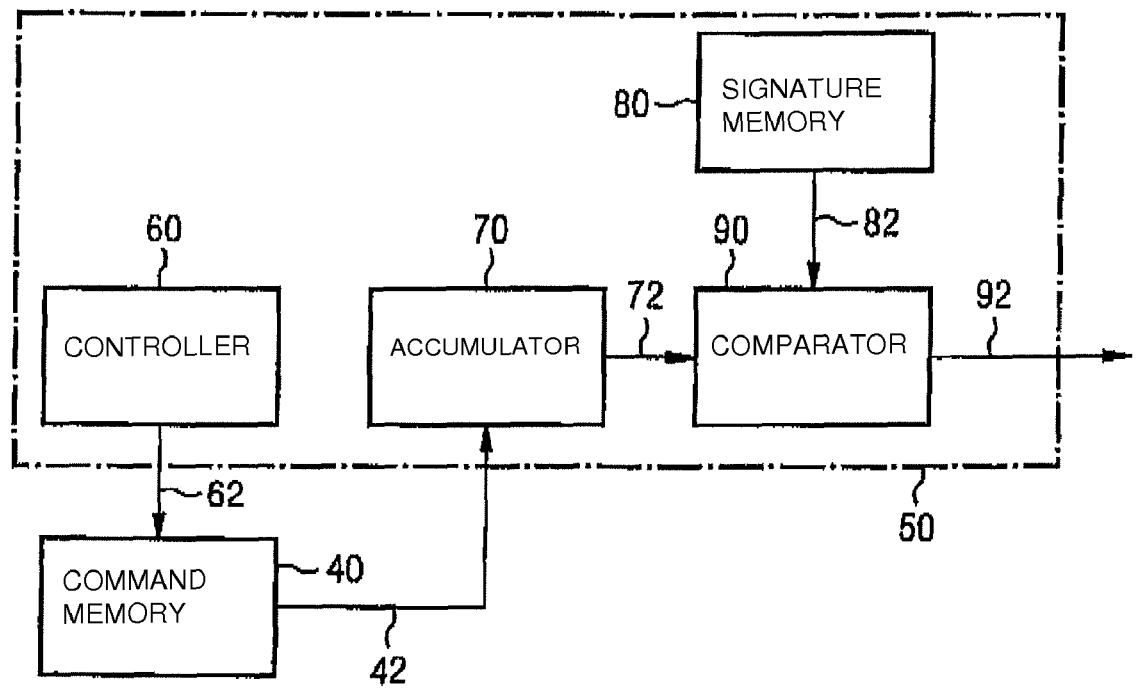
FIG. 1B shows an embodiment of an error detection device for a command decoder, wherein a signature of a read out sequence of control signal words is compared to a stored signature.

The module for determining the control signal word sequences in the data path, which is, for example, realized by a ROM and a counter, is illustrated only as ROM in FIGS. 1A and 1B to ensure better readability.

FIG. 1A shows an embodiment of an error detection device 10 for a command decoder with control device 20 and comparing device 30. The control device 20 is designed to provide an input word or an instruction 22 at a first time for reading out a sequence of control signal words associated with the instruction. The sequence of control signal words, possibly also several different sequences of control signal words if the sequence associated with the instruction depends on status signals or parameters, is stored in the command memory 40, for example a ROM, as explained above.

The control device 20 is further designed to provide the same input word 24 and/or the same instruction at a second time for reading out the sequence of control signal words associated with the input word, wherein the second time is delayed with respect to the first time. The comparing device 30 is designed to receive the associated sequence 26 of control signal words read out at a first time and the sequence 28 of control signal words read out at a second time, to compare them and to output a signal 32 indicating an error if the associated sequence 26 read out at the first time and the associated sequence 28 of control signal words read out at the second time are different.

The command memory 40 may be a single-port command memory, in which case the sequence of control signal words associated with the instruction at the second time is processed, for example after the completion of the control signal word sequence associated with the instruction at the first time, and is subsequently compared with the first control signal word sequence.

According to a preferred embodiment, the command memory is implemented as dual-port command memory, so that the sequence 28 of control signal words associated with the input word 24 at the second time may be processed in parallel, offset in time, to the control signal word sequence 26 associated with the input word 22 at the first time. The process with error detection may thus be accelerated as compared to a single-port command memory.

In a further embodiment of the error detection device, the comparing device 30 includes a first signal processing unit 30a and a second signal processing unit 30b, wherein the first signal processing unit receives the sequence 26 of control signal words read out by applying the input word 22 at the first time, and provides a first signal processing result, wherein the second signal processing unit receives the sequence 28 of control signal words read out by applying the input word 24 at the second time, and provides a second signal processing result, and wherein the comparing device 30 compares the first signal processing result and the second signal processing result. The signal processing unit may, for example, be an ALU or a sign extension unit.

The command memory 40 may be implemented as read-only memory (ROM), as random access memory (RAM), or as non-volatile memory (NVM), but typically ROMs are used.

The following will discuss the error detection for the module for determining the control word sequences in the data path in detail. The command memory 40 realizing the module for determining the control sequences in the data path together with a counter is, for example, realized as dual-port ROM. The counter with the corresponding environment logic is doubled. The instruction to be decoded is applied to the first input and, with a delay, to the second input of the ROM, the generated control word sequences are compared in a clock-correct way, or evaluated via the doubled ALUs. The status symbols of the first ALU are used for the generation of the control signal sequences on the first output, and the status symbols of the second ALU are used for the generation of the control signal sequences on the second output of the dual-port ROM.

If the delay is suitably chosen, all transient errors in the decoder are detected in this way. Permanent errors of the decoder are not detected. The inputs of the instruction decoder may be protected by tapping the inputs for the first input of the dual-port ROM prior to the check for the cache and the inputs for the second input of the ROM after the check for the cache.

The parameters of the instructions are provided without delay for the first ALU and potentially the first sign extension unit, and with delay for the doubled ALU and potentially for the doubled sign extension unit.

If the sign extension unit is provided only once, the results of the sign extension unit are provided directly at the first ALU and with a delay at the second ALU. There may then be implemented an additional error detection circuit for the sign extension unit and for possible extensions of this non-doubled unit. In particular, then the control logic for applying the parameters to the sign extension unit is preferably also adapted accordingly.

In the following, the error detection for the combinatorial circuit for the modification of the parameters of the instructions is considered. If the sign extension unit and the combinatorial circuit for adding zeros are doubled with the ALU, no special error detection circuit is required for this unit.

In a preferred embodiment, the ALU is doubled. If a potential sign extension unit is also doubled, the thus doubled sign extension units may formally be assigned to the respective ALUs. If this unit is realized only once, a special error detection circuit is required for the sign extension unit.

In other words, if they are not doubled and realized as a combinatorial circuit, they are preferably protected by a linear code. The inputs of the combinatorial circuit may be protected by, for example, tapping the inputs of the circuit prior to the check for the cache and the inputs for the generation of the code bits at the output of the circuit for a comparison with the code bits generated from the output signals after the check for the cache. Due to the relatively small word width, there may additionally be employed light-sensitive memory cells. In addition, the following is to be noted for the doubling of the signal processing unit or ALU. If the control signal sequences of the instructions in the instruction decoder, which is realized as dual-port ROM, also referred to as two-port ROM, are generated doubled with a time offset, the control signal sequences doubled with a time offset may be used for the two doubled ALUs now operating with a time offset.

This renders the comparison of the two control signal sequences with a time offset superfluous, because they may be compared by the ALU results. The advantage of this procedure is that now potential errors that may occur when reading out the data required for the operation may be detected via in that case different ALU results. Although a comparison of the control signal sequences shows whether the command decoder provides the correct control words for an operation, errors during the readout of the data required for the operations remain undetected. However, if the ALU results are compared, such transient errors in the computing path are also detected, and an extended protection also covering the calculating unit is implemented.

If the register field is not doubled, the register field is used for both ALUs, directly and with delay. The error detection is then performed with the same probability with which errors are detected in the ALU. That amounts to an error detection probability of $(1-2^{-16})$ in the case of doubling and comparison of a 16-bit ALU. If the error detection probability is improved, the error detection probability for the instruction decoder is automatically improved.

An alternative error detection for the module for determining the sequences of control signal words is to accumulate the control signal words for each instruction or portions of the instruction and to compare them with an accumulated value determined in parallel thereto.

FIG. 1B shows an embodiment of such an error detection device 50 having a control device 60, an accumulation device 70, a signature memory 80 and comparing device 90. Control device 60 is designed to provide the input word 62 and/or the instruction 62 for reading out the command memory 40 and to effect a readout of the associated sequence 42 of control signal words. The accumulation device 70 is designed to generate a signature 72 based on the read out sequence 42 of control signal words. The signature memory 80 is designed to store a signature 82 of the associated sequence. The comparing device 90 is designed to compare the signature 72 of the read out sequence of control signal words and the signature 82 of the associated sequence and to output a signal 92 indicating an error if the signature 72 of the read out sequence of control signal words and the signature 82 of the associated sequence of control signal words are different.

The control signal word sequences of an instruction may be input into a given, preferably non-linear automaton and/or accumulation device 70 and accumulated to a signature 72. For every new instruction 62, the non-linear automaton 70 has to be initialized anew.

If the control signal word sequence, both the associated control signal word sequence and the actually read out control signal word sequence 42, depends on data signals and parameter values, the results are two or three or more possible signatures 82, depending on the status signals, which are then stored in the signature memory 80 depending on the parameters or the status signals. If the sequence of control signal words does not depend on status signals, the result is only one signature 82 to be stored.

These signatures associated with the respective instructions and the status signals are realized as additional combinatorial circuit. Inputs of this circuit are the operation code of the instruction, the status signals and the parameter values. Outputs of this circuit are the signatures. The outputs of this combinatorial circuit are compared to the control words 42 accumulated in the, for example, non-linear automaton 70 at the end of each instruction 62 and/or the end of the sequence 42 of control signal words. If a shift register with linear feedback is used as accumulated automaton, errors shifted by exactly M bits are compensated for in M consecutive clocks. When designing a suitable non-linear automaton, the corresponding status symbols and parameter values may be treated as for the design of the module for generating the control signal word sequences. This allows to store the status symbols and parameter values of the respective instructions and/or the respective input word with corresponding masks in the ROM. A significant extension of the address ROM, which would otherwise be required for the operation code, is not necessary in this case, and the input word width of the ROM may be kept relatively small.

The invention may be used both for error detection and/or for the protection of the module for determining the control signal sequences or for error detection and/or for the protection of the whole instruction decoder. Accordingly, in one embodiment, the command decoder is the module for determining the control signal sequences, and in another embodiment it is the instruction decoder.

Consider by way of example the invention based on a Mov instruction and/or shift instruction from the Intel 80251 command set. The control of the processor core is done by device of a ROM-based decoder, but this circuit may, in principle, also be realized as a synthesizable logic. MOV Ri, @DRk transfers 1 byte, which is read via the address present in the double word register DRk, to the register Ri. The source of this operation may be an SFR register (SFR=special function register) or a byte from the memory. The distinction with respect to the two source classes is performed by the most significant bit (MSB) of the double word register DRk. This command is carried out by a decoder such that a common control signal sequence $S^1$ is initially generated. It generates an address and provides for the evaluation of the MSB of the double word register DRk. This sequence is identical for both access possibilities. Depending on the result of the evaluation of the most significant bit MSB (DRk) of the double word register, there are then, however, generated two different sequences $S^2$ and $S^{2'}$. The first control signal word is thus identical for both cases. Depending on the status signal MSB (DRk), there are then generated different control signal words. This division may then be protected by means of the method described above. This means that a mask of the status symbols (line A3) is stored so that the result is the evaluation of the generated control signal MSB (DRk). The subsequent comparison then decides between the two sequences. For this purpose, the thus created status vector is now compared to an expectation value of the status symbols stored in the ROM mask (line A4). If the assumption that the contents of the ALU match the expectation value proves to be right in this comparison, incrementing of the line counter in the ROM by 2 is performed and the sequence is executed from the line after the next one. Otherwise, the jump indicated in (A5) is performed and the control sequences from (A8) are executed. This implementation now allows the use of a dual-port ROM which then executes the operation for example by means of a time offset on two parallel calculating units or signal processing devices and thus allows a comparison of the results after processing each command. This check then serves for deciding whether or not there was an attack or error.

A further embodiment for the separation of commands by a status signal are conditional jumps, for example "JNZ rel" ("jump if not zero"=jump to relative address rel, if unequal to zero): Here, a jump instruction is executed or not depending on the status signal Z from the program status word PSW (PSW=program status word). Here, status information from the program status word PSW is used to perform a split and/or a separation of the control signal sequence generated by the decoder. In a first step, the program status word information is read in a read process. Depending on this value, two control sequences are generated such that a complete jump including access information is generated once. In the case of an invalid value of Z, however, no access information is generated. This procedure also allows the protection of the control signal sequences by means of the method described above.

In the following, the approach for error detection of the whole instruction decoder by signature formation is explained in more detail.

Abstractly, the instruction decoder associates exactly one sequence of control words $W^1, W^2, \ldots, W^{m(op,\sigma)}$ with each instruction "instruction(op)" present at its input consisting of operation code, [addresses]=[addr] and [parameters]=[par], depending on the current status symbols or parameter values $\sigma$.

A control word $W^i$ consists of control signals for the ALU and for driving the registers of the register field and furthermore of possibly modified [parameters].

From this abstract point of view, the instruction decoder may be regarded as function F{instruction(op, [addr], [par]), status symbols $\sigma$}=$W^1, W^2, \ldots, W^{n\ (op,\sigma)}$.

Any signature is formed on the sequence of control words $\Phi[W^1, W^2, \ldots, W^{n(op,\sigma)}]=\Phi$ (instruction(op), [addr], [par], status symbols $\sigma$).

A possible signature is the component-wise XOR sum of the (non-linear) transformed control words associated with an instruction, i.e. the operation code, the [addresses], the [parameters] and the corresponding status symbols.

The description of the signature $\Phi$ (instruction(op), [addr], [par], status symbols a) is directly derivable from a VDHL description (VDHL=very high description language) of the instruction decoder by accumulating the signals output at the outputs of the instruction decoder $W^1, W^2, \ldots, W^{n(op,\sigma)}$ in the mentioned non-linear automatons 70 and optimizing the thus obtained circuit.

The error detection may be done so that, for each instruction, the signature $\Phi$ (instruction(op), [addr], [par], status symbols $\sigma$) is compared to the corresponding combination (component-wise XOR sum of non-linearly transformed control words) $W^1, W^2, \ldots, W^{n(op,\sigma)}$ output by the instruction decoder.

In principle, the circuit for the realization of $\Phi$ (instruction (op), [addr], [par], status symbols $\sigma$) is simpler than the instruction decoder.

The circuit realizing the signature generates, for example, only one output vector per instruction and not a sequence of control words. This reduces the current consumption in this circuit part.

The clock-wise combination of the control words 42, which are output by the instruction decoder, by the mentioned non-linear automaton 70 is required to derive the signature 72 from the control words output by the instruction decoder. If there is no accumulation of the control words to an instruction at the output of the instruction decoder 40, the method leads to doubling and comparison.

Summarizing, three variants are possible for error detection in the instruction decoder. The first variant includes error detection for the individual modules of the instruction decoder using a dual-port ROM and the regeneration of input signals of the address decoder. In the second variant, control words accumulated to signatures for each instruction are compared. The third variant uses significantly light-sensitive memory cells and simple codes, but this alternative is not discussed in more detail here.

If the instruction decoder, as described above, is protected individually for its parts, a very high protection exists for the ROM for transient errors and for the address decoder. The same applies to the whole instruction decoder for error protection by means of signature formation.

The comparison of the time-offset outputs of the 2-port ROM may be omitted, if the two time-offset control signal sequences in the two doubled ALUs are processed with a time offset and the results of the ALU operation are compared.

Depending on the circumstances, the inventive method may be implemented in hardware or in software. The implementation may be done on a digital storage medium, particularly a disk or a CD with electronically readable control signals, which may cooperate with a programmable computer system so that the method is executed. In general, the invention thus also consists in a computer program product with a program code stored on a machine-readable carrier for performing the inventive method when the computer program product runs on a computer. In other words, the invention may thus be realized as a computer program with a program code for performing the method when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An error detection device for a command decoder reading out an associated sequence of control signal words from a command memory based on an input word, wherein the sequence of control signal words comprises at least one control signal word, comprising:
   control device configured to provide the input word at a first time and the input word at a second time for reading out the command memory, wherein the second time is delayed with respect to the first time, effecting a readout of the associated sequence of control signal words at a first time and a readout of the associated sequence of control signal words at a second time; and
   comparing device configured to receive and compare the sequences of control signal words read out at the first and second times, and to output a signal indicating an error if the sequence of control signal words read out at the first time and the sequence of control signal words read out at a second time are different,
   wherein the comparing device includes a first signal processing unit and a second signal processing unit, wherein the first signal processing unit receives the sequence of control signal words, which was read out by applying the input word at the first time, and provides a first signal processing result, wherein the second signal processing unit receives the sequence of control signal words, which was read out by applying the input word at the second time, and provides a second signal processing result, and wherein the comparing device compares the first signal processing result and the second signal processing result.

2. The error detection device of claim 1, wherein the command memory comprises two ports, wherein the control device operates to apply the input word at the first time to the first port of the command memory, and to apply the input word at the second time to the second port.

3. The error detection device of claim 1, wherein the first and the second signal processing unit is an arithmetic logic unit.

4. The error detection device of claim 1, wherein a delay between the first time and the second time is selected such that a transient error is detected.

5. An error detection device for a command decoder reading out an associated sequence of control signal words from a command memory based on an input word, wherein the sequence of control signal words comprises at least one control signal word, and wherein a predetermined signature is associated with the sequence of control signal words, comprising:
   a control device configured to provide the input word for reading out the command memory and for effecting a readout of the associated sequence of control signal words;
   an accumulation device configured to generate a signature based on the read out sequence of control signal words;

a signature memory configured to store the predetermined signature; and
a comparator configured to compare the signature of the read out sequence of control signal words and the predetermined signature and to output a signal indicating an error if the signature of the read out sequence of control signal words and the predetermined signature are different.

6. The error detection device of claim 5, wherein the accumulation device is formed as a non-linear automaton.

7. The error detection device of claim 5, wherein a sequence of control signal words read out from the command memory further depends on a status signal,
wherein the signature memory stores a predetermined signature of a sequence of control signal words associated depending on the status signal for each of a plurality of status signals, and
wherein the comparator receives the status signal and reads out the predetermined signature from the signature memory for the comparison depending on the status signal.

8. A method for error detection for a command decoder reading out an associated sequence of control signal words from a command memory based on an input word, wherein the sequence of control signal words comprises at least one control signal word, comprising:
providing the input word at a first time and providing the input word at a second time for reading out the command memory, wherein the second time is delayed with respect to the first time, to effect a readout of the associated sequence of control signal words at a first and second time; and
receiving and comparing the sequence read out at the first time and the sequence of control signal words read out at the second time to output a signal indicating an error if the associated sequences of control signal words read out at the first and second times are different,
wherein comparing includes
receiving and processing the sequence of control signal words, which was read out by applying the input word at the first time, and providing a first signal processing result,
receiving and processing the sequence of control signal words, which was read out by applying the input word at the second time, and providing a second signal processing result, and
comparing the first signal processing result and the second 30 signal processing result.

9. A method for error detection for a command decoder reading out an associated sequence of control signal words from a command memory based on an input word, wherein the sequence of control signal words comprises at least one control signal word, and wherein a predetermined signature is associated with the sequence of control signal words, comprising:
providing the input word for reading out the command memory;
reading out the associated sequence of control signal words from the command memory;
generating a signature based on the read out sequence of control signal words; and
receiving and comparing the signature of the read out sequence of control signal words and the predetermined signature to output a signal indicating an error if the signature of the read out sequence of control signal words and the predetermined signature are different.

10. A computer program product comprising a program code stored on a machine-readable carrier for executing a method for error detection for a command decoder reading out an associated sequence of control signal words from a command memory based on an input word, wherein the sequence of control signal words comprises at least one control signal word, when the computer program runs on a computer, the method comprising:
providing the input word at a first time and providing the input word at a second time for reading out the command memory, wherein the second time is delayed with respect to the first time, to effect a readout of the associated sequence of control signal words at a first and second time; and
receiving and comparing the sequence read out at the first time and the sequence of control signal words read out at the second time to output a signal indicating an error if the associated sequences of control signal words read out at the first and second times are different,
wherein comparing includes
receiving and processing the sequence of control signal words, which was read out by applying the input word at the first time, and providing a first signal processing result,
receiving and processing the sequence of control signal words, which was read out by applying the input word at the second time, and providing a second signal processing result, and
comparing the first signal processing result and the second signal processing result.

11. A computer program product comprising a program code stored on a machine-readable carrier for executing a method for error detection for a command decoder reading out an associated sequence of control signal words from a command memory based on an input word, wherein the sequence of control signal words comprises at least one control signal word, and wherein a predetermined signature is associated with the sequence of control signal words, when the computer program runs on a computer, the method comprising the steps of providing the input word for reading out the command memory; reading out the associated sequence of control signal words from the command memory; generating a signature based on the read out sequence of control signal words; and receiving and comparing the signature of the read out sequence of control signal words and the predetermined signature to output a signal indicating an error if the signature of the read out sequence of control signal words and the predetermined signature are different.

12. An error detection device for a command decoder reading out an associated sequence of control signal words from a command memory based on an input word, wherein the sequence of control signal words comprises at least one control signal word, comprising:
control means for providing the input word at a first time and the input word at a second time for reading out the command memory, wherein the second time is delayed with respect to the first time, for effecting a readout of the associated sequence of control signal words at a first time and a readout of the associated sequence of control signal words at a second time; and
comparing means for receiving and comparing the sequences of control signal words read out at the first and second times, and for outputting a signal indicating an error if the sequence of control signal words read out at the first time and the sequence of control signal words read out at a second time are different, wherein the comparing means includes a first signal processing unit and a second signal processing unit, wherein the first signal processing unit receives the sequence of control signal words, which was read out by applying the input word at the first time, and provides a first signal processing result, wherein the second signal processing unit receives the sequence of control signal words, which was read out by applying the input word at the second time, and provides a second signal processing result, and wherein the comparing means compares the first signal processing result and the second signal processing result.

13. An error detection device for a command decoder reading out an associated sequence of control signal words from a command memory based on an input word, wherein the sequence of control signal words comprises at least one control signal word, and wherein a predetermined signature is associated with the sequence of control signal words, comprising:

a control means for providing the input word for reading out the command memory and for effecting a readout of the associated sequence of control signal words;

an accumulation means for generating a signature based on the read out sequence of control signal words;

a signature memory for storing the predetermined signature; and a comparing means for comparing the signature of the read out sequence of control signal words and the predetermined signature and for outputting a signal indicating an error if the signature of the read out sequence of control signal words and the predetermined signature are different.

* * * * *